Feb. 5, 1957

C. S. CUSICK 2,780,039

GLASS LAYING APPARATUS

Filed May 11, 1954

INVENTOR.
CHARLES S. CUSICK

BY Oscar L. Spencer

ATTORNEY

United States Patent Office 2,780,039
Patented Feb. 5, 1957

2,780,039

GLASS LAYING APPARATUS

Charles S. Cusick, Ford City, Pa., assignor to Pittsburgh Plate Glass Company, Allegheny County, Pa., a corporation of Pennsylvania Application May 11, 1954, Serial No. 428,985

6 Claims. (Cl. 51—240)

This application relates to improvement in glass laying apparatus. In particular, the present invention concerns apparatus for laying sheets of rough rolled glass on a moving table upon which the sheets are conveyed during grinding and polishing operations in the fabrication of polished plate glass.

Typical apparatus for the fabrication of polished plate glass includes a conveyor and a plurality of movable tables which are carried along the length of the conveyor in an abutting relationship to provide a continuous elongated surface upon which a plaster slurry is applied. Rough rolled glass is embedded into the plaster slurry which hardens, thus fixing the glass onto the tables. The embedded glass is conveyed beneath a plurality of grinders and polishers which surface the glass.

The moving tables are reinforced at their edges by means of metallic edge strips. In the past, rough glass sheets placed upon the tables have been slid against these metallic strips, thus causing vents and chips to appear in the edges of the glass sheets. These chips and vents frequently remained on the surface of the glass and eventually became embedded in the faces of the polishers farther down the grinding and polishing line. These chips abraded the surface of the glass being polished, thereby spoiling the results of the surfacing operations. I have eliminated the cause of such venting and chipping by providing abutting means overlapping the side of the polishing table against which the sheets are slid during laying. This abutting means provides a soft yieldable cushion for the edge of the glass sheets and keeps the glass sheets from bumping the edge strip, thereby preventing chips and vents.

The principal object of the present invention is to eliminate chipping and venting of glass sheets laid upon a conveyor for a grinding and polishing line. Another object of the present invention is to provide apparatus for accomplishing the above object. These and other objects of the present invention will be understood with reference to the accompanying description and drawings.

Figure 1:
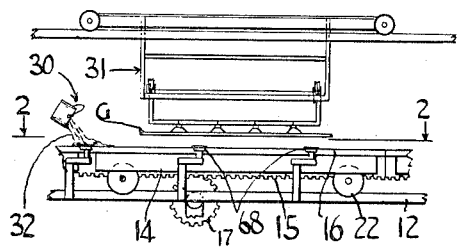
Fig. 1 is a longitudinal side elevation of a portion of a grinding and polishing line for the surfacing of plate glass, showing the relationship of the present invention to such apparatus.

Referring to the drawings, a pair of tracks 12 provide a runway upon which a plurality of tables 14 each provided with an upper surface 16 can be moved in abutting relationship. Frame members 18 extend downwardly from the table top 16 inwardly of the edges of the tables 14. Each frame 18 is connected to a stub axle 20 upon which a wheel 22 rotates. A suitable drive (not shown) is provided for moving the tables longitudinally of the tracks 12, by engagement of a rack 15 depending from the tables 14 with a driven gear 17.

At each side edge of the table 14 there is provided an L-shaped metallic table edge strip 24 suitably connected to the table as by bolts 26, for example. The upper extremity 28 of the L-shaped table edge strip 24 extends slightly above the top surface 16 of each table, about 1/8 inch, for example, to provide a marginal retainer for the plaster slurry.

Figure 2:
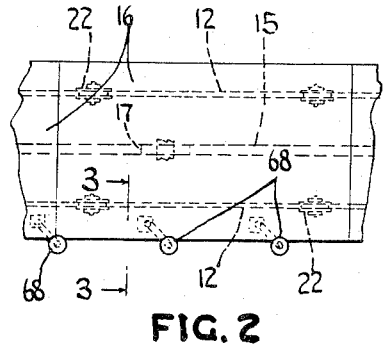
Fig. 2 is a plan view along lines 2—2 of Fig. 1.

As seen in Figs. 1 and 2, the tables 14 are first conveyed past a station 30 where a thin uniform bed 32 of plaster slurry is applied. Subsequently, the tables are conveyed past a crane 31 where the glass sheets G are laid upon the plaster slurry.

Figure 3:
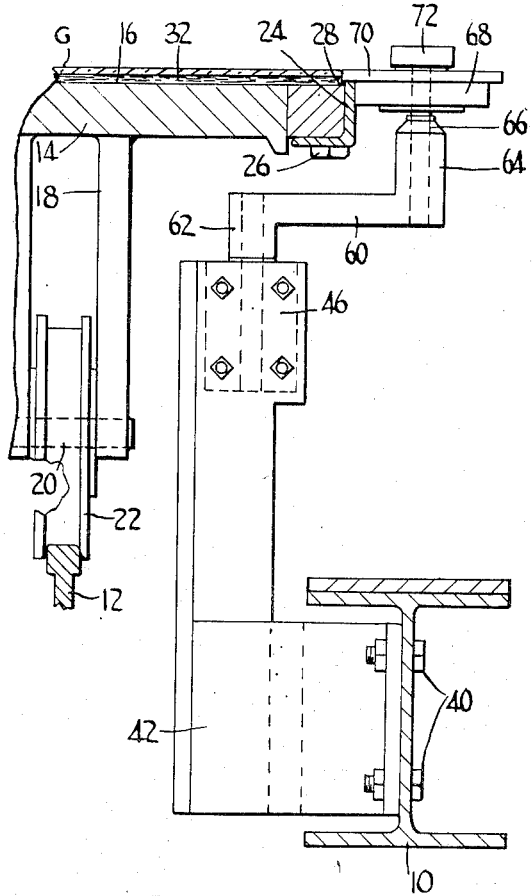
Fig. 3 is a partial sectional view taken along the lines 3—3 of Fig. 2.
Figure 4:
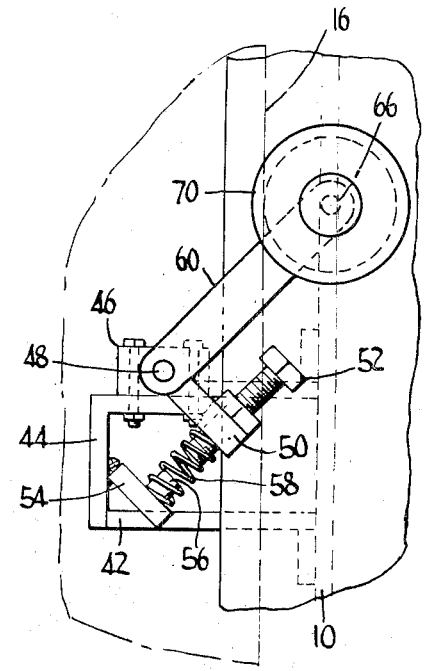
Fig. 4 is a detail of the apparatus comprising the present invention.

At the section depicted in Fig. 3, the plaster slurry 32 and the glass G have been deposited on the table top 16. Attached to an I-beam 10 by bolts 40 are a plurality of cross beams 42 extending inwardly of the I-beam. A vertically directed L beam 44 is connected to each cross beam 42. At the upper portion of the vertically directed L beam 44 is attached a housing 46. A vertically extending shaft 48 is rotatably mounted in housing 46. The lower end of the shaft is connected to an internally threaded arm 50 through which an adjustable bolt 52 is screwed. A stop member 54 is soldered to the L beam 44 at the same level that arm 50 is attached to shaft 48. A lug 56 extends from the member 54 toward the arm 50. A spring 58 is interfitted between the lug 56 and the portion of the bolt 52 extending through the internal screw threaded hole of arm 50.

The upper end of the shaft 48 is rigidly connected to a rotatable horizontal arm 60 at a downwardly directed portion 62 of the latter. The other end of the horizontal arm 60 is provided with an upwardly directed portion 64 which provides a sleeve within which an axle 66 is freely rotatable. Portion 64 extends from below the level of tables 14 to a height slightly above the table surface, thus allowing arm 60 to rotate without contacting the moving tables.

A fiber wheel 68 having a lower portion of relatively small diameter and an upper flanged portion 70 of relatively large diameter is fixedly secured to the upper end of the axle 66. A retaining member 72 insures that the wheel 68 remains fixed on the axle 66. Wheel 68 is preferably of a material that does not damage the glass upon contact. Various fibrous materials have been found quite suitable for the wheel. Hard rubber, hard wood and a fibrous material sold under the trade name "Micarta" are desirable as they are softer than glass and do not chip glass on contact.

As the tables are conveyed past the wheels 68, the action of the spring 58 tends to rotate arm 50, shaft 48, horizontal arm 60, axle 66 and wheel 68 in such a direction that the latter abuts the edge of the table strip and the flange 70 overlaps the top of the table. Thus, when an operator slides a glass sheet onto the top of the table, the edge of the glass sheet abuts against the flange portion 70 of the fiber wheel rather than the upper extremity 28 of the table edge strip 24. The cushioning effect of fibrous material used for the abutting wheel plus the resiliency offered by the spring 58 inhibits the venting or chipping likely to occur if the glass sheets should contact the upper extremities 28 of the metallic table edge strips 24.

It has been found advisable to provide three flanged fiber wheels 68 in equally spaced relation at the side of the assembly opposite that from which the glass is laid onto the table top at the glass laying station. Furthermore, the spacing between the wheels should be less than the length of the sheets to be laid. This insures that the glass is aligned properly when slid on the tables.

The wheels 68 are preferably free running in order to minimize the wear that would otherwise result from abrasion resulting from movement of the tables past the wheels. Not only does free rotation of the wheels lessen abrasion, but also the lessened abrasion resulting from free rotation equalizes this effect about the wheel periphery. This results in a longer wheel life.

The fact that the wheels 68 are urged by a spring against the table edge strip 24 results in additional safety. For example, if an operator's hand should be caught between the moving tables and a wheel, the operator can free his hand by opposing the action of the spring to separate the wheel from the table.

The details of a single embodiment of my invention have been presented for purposes of illustration rather than limitation.

What is claimed is:

1. In apparatus for mounting glass sheets upon a table for subsequent grinding and polishing, said table being provided with an upper surface for supporting glass in sheet form embedded in plaster and a marginal edge strip extending slightly above the top surface of said table to provide a marginal retainer for the plaster, support means located along one side of the table, cushioning means carried by said support means and spaced inwardly from the one side of the table a distance in excess of the thickness of the marginal edge strip, and means urging said cushioning means into a glass edge contacting position for locating the contacted glass edge in spaced relation inwardly of the one side of the table.

2. In apparatus for surfacing glass comprising a conveyor, a plurality of tables movable in abutting relation along said conveyor, each of said tables provided with an upper surface for supporting glass sheets embedded in plaster and a marginal edge strip extending slightly above said upper surface to provide a marginal retainer for said plaster, and a loading station wherein glass sheets are mounted on said tables, the improvement comprising support means along one side of said conveyor at said loading station, guide means carried by said support means, said guide means comprising resilient abutment means overlapping one side of the moving tables a distance in excess of the thickness of said marginal strip and means urging said abutment means inwardly of the one side of the tables into a position to contact a glass edge surface to provide cushioning means for the edge surface of the glass sheet in spaced relation to the sides of the tables.

3. In apparatus according to claim 2 wherein the abutment means comprises a flanged wheel mounted for rotation in a horizontal plane, the flange of said flanged wheel overlapping the one side of the moving tables in close proximity to said surface.

4. In apparatus according to claim 2, wherein the abutment means comprises a plurality of spring urged free running flanged wheels urged against the one side of the moving tables and whose flange overlaps the top of the table in close proximity thereto.

5. In apparatus according to claim 2, wherein said cushioning means includes at least one free-running wheel of a material that does not chip glass having a lower portion bearing against the one side of the moving tables and an upper portion coaxially aligned with said lower portion and of larger diameter extending inwardly of the side of the table above the table top in close proximity thereto.

6. In apparatus for mounting glass sheets upon a series of moving tables, means for moving the tables in succession past a glass loading station, a housing located at one side of the glass loading station beneath the surface defined by the moving tables, a spring urged horizontal arm rotatable about said housing in a horizontal plane beneath the surface defined by the moving tables, said horizontal arm having an upwardly directed extension extending beyond the surface and defining a vertical sleeve, an axle mounted for free rotation in said sleeve, a wheel rotatable in a horizontal plane fixed to said axle, said wheel being provided with a lower portion of reduced diameter urged against one side of the moving tables and an upper portion of increased diameter adjacent said lower portion and overlapping the table a short distance inwardly from the one side thereof to provide a resilient abutment means against which one side of the glass sheets abut when the latter are loaded on the tables.

References Cited in the file of this patent

UNITED STATES PATENTS

| | | |
|---|---|---|
| 1,754,955 | Kruse | Apr. 15, 1930 |
| 1,934,794 | Fisher | Nov. 14, 1933 |
| 2,122,466 | Heichert | July 5, 1938 |
| 2,705,854 | Laverdisse | Apr. 12, 1955 |